(12) United States Patent
Nakai et al.

(10) Patent No.: US 6,292,885 B1
(45) Date of Patent: Sep. 18, 2001

(54) METHOD OF ESTIMATING EFFECT OF PARALLEL PROCESSING AND RECORDING MEDIUM FOR METHOD

(75) Inventors: Hajime Nakai; Tamotsu Honda, both of Kawasaki; Makoto Komura, Nagoya, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/041,956

(22) Filed: Mar. 13, 1998

(30) Foreign Application Priority Data

Oct. 20, 1997 (JP) .................................................... 9-287385

(51) Int. Cl.$^7$ ...................................................... G06F 7/00
(52) U.S. Cl. .......................................... 712/219; 709/106
(58) Field of Search ..................... 702/182, 186; 709/100–106; 712/23, 32, 33, 200–207, 216–218, 219

(56) References Cited

U.S. PATENT DOCUMENTS

| | | | |
|---|---|---|---|
| 4,805,134 | * | 2/1989 | Calo et al. ............................. 707/10 |
| 5,133,077 | * | 7/1992 | Karne et al. ........................... 712/23 |
| 5,179,672 | * | 1/1993 | Genduso et al. ...................... 713/600 |
| 5,502,826 | * | 3/1996 | Vassiliadis et al. .................. 712/213 |

FOREIGN PATENT DOCUMENTS 9-6628    1/1997    (JP) .

\* cited by examiner

*Primary Examiner*—Marc S. Hoff
*Assistant Examiner*—Craig Steven Miller
(74) *Attorney, Agent, or Firm*—Staas & Halsey LLP

(57) ABSTRACT

An apparatus automatically estimates the effect of processing steps of procedures in parallel by computer. The apparatus collects SMF (system management function) records from an SMF data set that is in a magnetic disk, analyzes the SMF records, calculates series-processing time for processing the steps of the procedures in series, estimates, from the SMF records, time reduction produced by processing the steps of the procedures in parallel, and subtracts the time reduction from the series-processing time, to estimate parallel-processing time for processing the steps of the procedures in parallel.

19 Claims, 12 Drawing Sheets

Fig.4

```
0    10    20    30    40    50    60    70    80    90
+.....*....+....*....+....*....+....*....+....*....+....*....+....*....+....*....+....*....+....*.
         PDCF/TOOL V12L10   EFFECT-LIST       DATE yy-mm-dd   TIME hh:mm:ss
                                                   ①              ②
```

① : EXECUTION DATE
② : EXECUTION TIME

Fig.5

```
               0         10        20        30        40        50        60        70        80        90        100       110       120
               +....*....+....*....+....*....+....*....+....*....+....*....+....*....+....*....+....*....+....*....+....*....+....*....+
1ST SECTION
2ND SECTION    JOB-NAME  EXCEL  EF  START              END           ELAPSED       CPU-TIME      ESTIMATE      DECREMENT     RATE [REASON]
               xxxxxxxx  xxxxx  xx  99:99:99.99 99-99-99  99:99:99.99  99:99:99.99  99:99:99.99  99:99:99.99  99:99:99.99   z9% [xxxxxxxx]

3RD SECTION    [ GROUP      STEP  START        END
                 xxxxxxxx   zz9   99:99:99.99  99:99:99.99
                 ...        ...   ...          ...

4TH SECTION    [ NO.  STEP-NAME I/O-AVE.GROUP          START        END          ELAPSED      CPU-TIME     ESTIMATE     DECREMENT    RATE
                 zz9  xxxxxxxx  9.9999 xxxxxxxx       99:99:99.99  99:99:99.99  99:99:99.99  99:99:99.99  99:99:99.99  99:99:99.99  z9%
                 ...  ...       ...    ...            ...          ...          ...          ...          ...          ...          ...

APL  NO.  DDNAME    DECREMENT    RATE
                                                 x x  zz9  xxxxxxxx  99:99:99.99  z9%
                                                 ...  ...  ...       ...          ...

5TH SECTION    [ DATA-SET-NAME
                 xxxxxxxxxxxxxxxxxxxxxxxxxxxxxxxxxxxxxxxxxx
                 ...
```

Fig.6A (LEFT HALF)

| JOB-NAME | EXCEL | EF | START | END | ELAPSED |
|---|---|---|---|---|---|
| xxxxxxxx | xxxxx | xx | 99:99:99.99 99-99-99 | 99:99:99.99 | 99:99:99.99 |
| (a) | (b) | (c) | (d) | (e) | (f) |

Fig.6B (RIGHT HALF)

| CPU-TIME | ESTIMATE | DECREMENT | RATE | [REASON] |
|---|---|---|---|---|
| 99:99:99.99 | 99:99:99.99 | 99:99:99.99 | z9% | [xxxxxxxx] |
| (g) | (h) | (i) | (j) | (k) |

Fig.7

| GROUP | STEP | START | END | ELAPSED | CPU-TIME | ESTIMATE | DECREMENT | RATE |
|---|---|---|---|---|---|---|---|---|
| xxxxxxxx | zz9 | 99:99:99.99 | 99:99:99.99 | 99:99:99.99 | 99:99:99.99 | 99:99:99.99 | 99:99:99.99 | z9% |
| ...(a) | ...(b) | ...(c) | ...(d) | ...(e) | ...(f) | ...(g) | ...(h) | ...(i) |

Fig. 8A
(LEFT HALF)

| NO. | STEP-NAME | I/O-AVERAGE | GROUP | START | END | ELAPSED |
|---|---|---|---|---|---|---|
| zz9 | xxxxxxxxxxxxxxxxxx | 9.9999 | xxxxxxxx | 99:99:99.99 | 99:99:99.99 | 99:99:99.99 |
| (a) | (b) | (c) | (d) | (e) | (f) | (g) |

Fig. 8B
(RIGHT HALF)

| CPU-TIME | ESTIMATE | DECREMENT | RATE |
|---|---|---|---|
| 99:99:99.99 | 99:99:99.99 | 99:99:99.99 | z9% |
| (h) | (i) | (j) | (k) |

Fig.9

| DATA-SET-NAME | APL | NO. | DDNAME | DECREMENT | RATE |
|---|---|---|---|---|---|
| xxxxxxxxxxxxxxxxxxxxxxxxxxxxxxxxxxxxxx... | x x ... | zz9 ... | xxxxxxx ... | 99:99:99.99 ... | z9% ... |
| (a) | (b)(c) | (d) | (e) | (f) | (g) |

PDCF/TOOL V12L10   EFFECT-LIST      DATE 97-03-01  TIME 12:00:00

JOB-NAME  EXCEL  EF  START                END                ELAPSED        CPU-TIME       ESTIMATE       DECREMENT      RATE
JOB001    APPLY  OK  16:44:15.12 97-02-28  17:01:02.77       00:16:47.65    00:01:03.25    00:02:03.24    00:14:44.41    88%

GROUP     STEP   START           END             ELAPSED        CPU-TIME       ESTIMATE       DECREMENT      RATE
GROUP001    2    16:44:15.14     17:01:02.61     00:16:39.44    00:01:03.20    00:02:03.03    00:14:44.41    88%

NO. STEP-NAME  I/O-AVE. GROUP     START           END             ELAPSED        CPU-TIME       ESTIMATE       DECREMENT      RATE
 1  CALC       0.0005   GROUP001  16:44:15.14     16:48:28.08     00:04:13.94    00:00:21.25    00:01:16.27    00:02:57.67    70%
 2  LIST       0.0017   GROUP001  16:48:28.11     17:01:02.61     00:12:34.50    00:00:42.95    00:01:24.89    00:11:00.61    89%

DATA-SET-NAME
&&LIST                     APL  NO.  DDNAME  DECREMENT      RATE
                           P -   1   OUT     00:02:57.67    70%
                                 2   IN      00:11:00.61    89%
```

Fig.11

| JOB STEP NO. | DD STATEMENT NO. | JCL | | PARA PIPE GRP |
|---|---|---|---|---|
| 1 | | //TEST | JOB | |
| 1 | | //ST1 | EXEC PGM=TEST1 | |
| 1 | 1 | //DD1 | DD DSN=Z,DISP=OLD | |
| 1 | 2 | //DD2 | DD DSN=&&A,DISP=(NEW,PASS) | <= G001 |
| 2 | | //ST2 | EXEC PGM=TEST2 | |
| 2 | 1 | //DD1 | DD DSN=&&B,DISP=(NEW,PASS) | <= G001 — P001 |
| 3 | | //ST3 | EXEC PGM=TEST3 | |
| 3 | 1 | //DD1 | DD DSN=&&A,DISP=(OLD,DELETE) | <= G001 — P001 |
| 4 | | //ST4 | EXEC PGM=TEST4 | |
| 4 | 1 | //DD1 | DD DSN=&&B,DISP=(OLD,DELETE) | <= G001 |
| 4 | 2 | //DD2 | DD DSN=Z,DISP=SHR | <= G002 |
| 4 | 3 | //DD3 | DD DSN=&&C,DISP=(NEW,PASS) | <= G002 — P002 |
| 5 | | //ST5 | EXEC PGM=TEST5 | |
| 5 | 1 | //DD1 | DD DSN=&&C,DISP=(OLD,DELETE) | <= G002 — P002 |
| 5 | 2 | //DD2 | DD DSN=&&D,DISP=(NEW,PASS) | <= G002 — P003 |
| 6 | | //ST6 | EXEC PGM=TEST6 | |
| 6 | 1 | //DD1 | DD DSN=&&D,DISP=(OLD,DELETE) | <= G002 — P003 |
| 7 | | //ST7 | EXEC PGM=TEST7 | |
| 7 | 1 | //DD1 | DD DSN=Z,DISP=SHR | |

METHOD OF ESTIMATING EFFECT OF PARALLEL PROCESSING AND RECORDING MEDIUM FOR METHOD

BACKGROUND OF THE INVENTION

1. Field of the Invention

The present invention relates to a method of estimating the effect of parallel processing achieved by a computer and a recording medium used for the method. In particular, the present invention relates to a method of estimating parallel-processing time required by a computer to process steps of a procedure in parallel with the use of a pipe data set. The pipe data set is prepared in a system memory and is used to transfer data among the steps of the procedure to be processed in parallel. Based on the estimated parallel-processing time, the method estimates the effect of the parallel processing of the steps. The present invention also relates to a recording medium used for the method.

2. Description of the Related Art

A JCL (job control language) describes a job to be processed by computer. Each job consists of procedures that are called job steps. Each procedure, i.e., job step consists of steps. Steps and job steps are processed sequentially in described order. Any computer capable of processing instructions in parallel processes job steps in parallel to improve efficacy. If a data set provided by a first job step is required by a second job step that follows the first job step, the data set is stored as a pipe data set in a virtual file in system memory instead of being stored in a direct access storage device or a magnetic tape device. A given job is usually processed through a batch process, and a batch process that uses such a pipe data set is called an excel batch in this specification, and a batch process that does not use it is called a normal batch.

Japanese Unexamined Patent Publication No. 9-6628 of this applicant discloses a method of and an apparatus for selecting procedures to be processed in parallel. This disclosure examines at least one data set in consecutive procedures to see how the data set is used and selects procedures that are processible in parallel as a data set used for a pipe data set. The pipe data set will be explained.

FIG. 12 shows a pipe data set used to transfer data among job steps that are processed in parallel. The pipe data set is a system memory file into which a job step 1 writes data and from which job steps 2 and 3 read data.

The job step 1 provides data pieces B1 to Bn, which are immediately transferred to the job steps 2 and 3 through the pipe data set. The pipe data set is then cleared, so that a small area of 64 kilobytes to several hundreds of kilobytes for the pipe data set in a system memory is effectively used to transfer even a large amount of data pieces.

The space for the pipe data set is secured in the system memory whenever one of the job steps 1 to 3 first opens the pipe data set. When none of the job steps open the pipe data set, environments for accessing the pipe data set are prepared.

If, for example, the job step 2 tries to read data and if the job step 1 has not yet written data into the pipe data set, the job step 2 must wait for the job step 1 to write the data. When the job step 1 writes data pieces B1 to Bn into the pipe data set, the pipe data set is saved as a temporary system memory file.

The job steps 2 and 3 immediately read the data pieces in order of B1 to Bn. Namely, the job steps on the reading side receive identical data. As soon as the data pieces are completely read, the pipe data set is cleared to free the space. This space is cyclically used.

If the pipe data set is full, the job step 1 must wait to write data until the job steps 2 and 3 read data to free the space of the pipe data set. If the pipe data set is empty, the job steps 2 and 3 must wait to read data until the job step 1 writes data into the pipe data set. In this way, data transfer between the job step 1 and the job steps 2 and 3 is carried out in parallel asynchronously.

If some job steps are processible in parallel in an excel batch with the use of a pipe data set, it is necessary to estimate an efficiency improvement realized by the parallel processing of the job steps compared with the serial processing thereof. Namely, it is necessary to estimate parallel-processing time for processing the job steps in parallel and time reduction produced by the parallel processing of the job steps. The prior art forces the user to manually calculate the parallel-processing time and time reduction according to SMF (System Management Function) records of the job steps. The SMF prepares a job schedule and collects, as SMF records, various event data such as job start time and job end time. The prior art needs a long time and much labor to manually calculate the parallel-processing time and time reduction.

SUMMARY OF THE INVENTION

An object of the present invention is to provide a method of automatically estimating the effect of processing steps of procedures in parallel by a computer and a recording medium used for the method.

FIG. 1 shows a basic arrangement of the present invention to accomplish the object. An apparatus 1 for estimating the effect of processing steps of procedures in parallel is realized with a computer. An SMF data set 2 is in a storage device such as a magnetic disk and contains SMF records prepared when processing the steps in series. The apparatus 1 collects the SMF records, analyzes them, calculates series-processing time for processing the steps in series, estimates the time reduction produced by processing the steps in parallel, and estimates parallel-processing time by subtracting the time reduction from the series-processing time, thereby estimating the effect of the parallel processing of the steps.

The method may edit the parallel-processing time and time reduction and output an estimated effect list 5 through a printer or a CRT.

In this way, the method automatically estimates and outputs the effect of processing steps of procedures in parallel by computer.

The present invention also provides a method of estimating the effect of processing first and second procedure groups in parallel by a computer. The first procedure group transfers data through a pipe data set, and the second procedure group transfers no data through a pipe data set. The method includes the steps of collecting SMF records prepared when processing the first and second procedure groups in series, calculating, from the SMF records, series-processing time for processing the first and second procedure groups in series, summing up estimated processing time of each procedure of the first procedure group according to the SMF records, to provide a first processing time for processing the first procedure group in parallel, choosing a maximum among the values of estimated processing time of procedures of the second procedure group according to the SMF records, to provide a second processing time for processing the second procedure group in parallel, choosing a maximum between the values of the first and second processing times, to provide parallel-processing time for processing the first and second procedure groups in parallel, and estimating time reduction produced by the parallel processing of the first and second procedure groups by subtracting the parallel-processing time from the series-processing time, thereby estimating the effect of processing the first and second procedure groups in parallel.

The method may further have the steps of editing the parallel-processing time and time reduction and outputting an estimated effect of parallel processing through a printer or a CRT.

The procedure groups may form a composite procedure. Series-processing time of the composite procedure is calculated by summing up the parallel-processing time of each of the procedure groups.

A procedure may consist of first and second groups of steps. The first group of steps transfer data through a pipe data set, and the second group of steps transfer no data through a pipe data set. In this case, the present invention provides a method of estimating the effect of processing the first group of steps in parallel by computer. The method includes the steps of collecting SMF records prepared when processing the procedure in series, and estimating, from the SMF records, a time reduction produced by processing the first group of steps in parallel, thereby estimating the effect of processing the first group of steps in parallel.

This method may further have the steps of editing the estimated effect and outputting the edited result through a printer or a CRT.

The procedure may consist of a plurality of first groups of steps. In this case, the method of the present invention includes the steps of summing up the estimated time reductions of each first group of steps, to estimate a time reduction achieved in the procedure, calculating, from the SMF records, a series-processing time for processing the procedure in series, and subtracting the time reduction from the series-processing time, to estimate parallel-processing time for processing the procedure in parallel.

In addition to analyzing the SMF records, the method may further have the step of analyzing JCL (job control language) that describes each instruction of each step of each procedure, to identify any group of steps that transfer data through a pipe data set.

The method may further have the step of receiving data from a procedure library (4 in FIG. 1) that is stored in, for example, a magnetic disk and is called by JCL, to improve the accuracy of estimation of the effect of parallel processing.

The present invention also provides a recording medium for recording a program, which is read and executed by computer. The program makes the computer collect SMF records prepared when processing steps of procedures in series, calculate, from the SMF records, a series-processing time for processing the steps in series, estimate, from the SMF records, a time reduction produced by processing the steps in parallel, and estimate a parallel-processing time by subtracting the time reduction from the series-processing time, thereby estimating the effect of processing the steps in parallel by a computer.

The recording medium of the present invention may record a program for editing the estimated effect and output the edited result through a printer or a CRT.

BRIEF DESCRIPTION OF THE DRAWINGS

The present invention will be more clearly understood from the description as set forth below with reference to the accompanying drawings, wherein:

FIG. 4 shows an example of a header of the list of FIG. 3;

FIG. 5 shows an example of an output form of an estimated parallel-processing effect according to the present invention;

FIGS. 6A and 6B show an example of an output form of an estimated parallel-processing effect on a job according to the present invention;

FIG. 7 shows an example of an output form of an estimated parallel-processing effect on job step groups according to the present invention;

FIGS. 8A and 8B show an example of an output form of an estimated parallel-processing effect on job steps according to the present invention;

FIG. 9 shows an example of an output form of an estimated parallel-processing effect on data sets according to the present invention;

FIG. 10 shows an example of an estimated effect list according to the present invention;

FIG. 11 shows an example of a JCL for job steps to be processed in parallel.

DESCRIPTION OF THE PREFERRED EMBODIMENTS

The preferred embodiments of the present invention will be described below with reference to the accompanying drawings.

Figure 1:
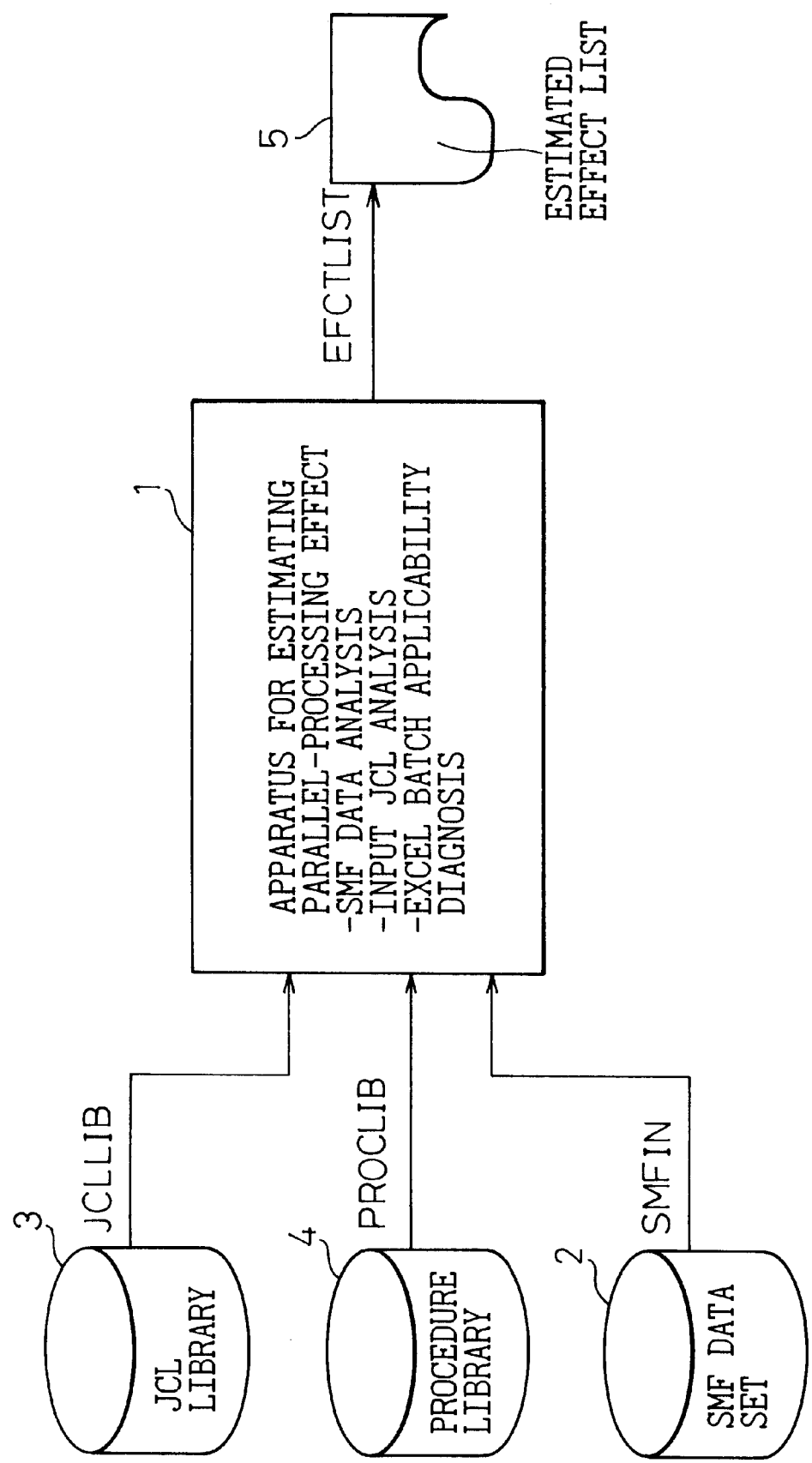
FIG. 1 shows a basic arrangement of the present invention.
Figure 2:
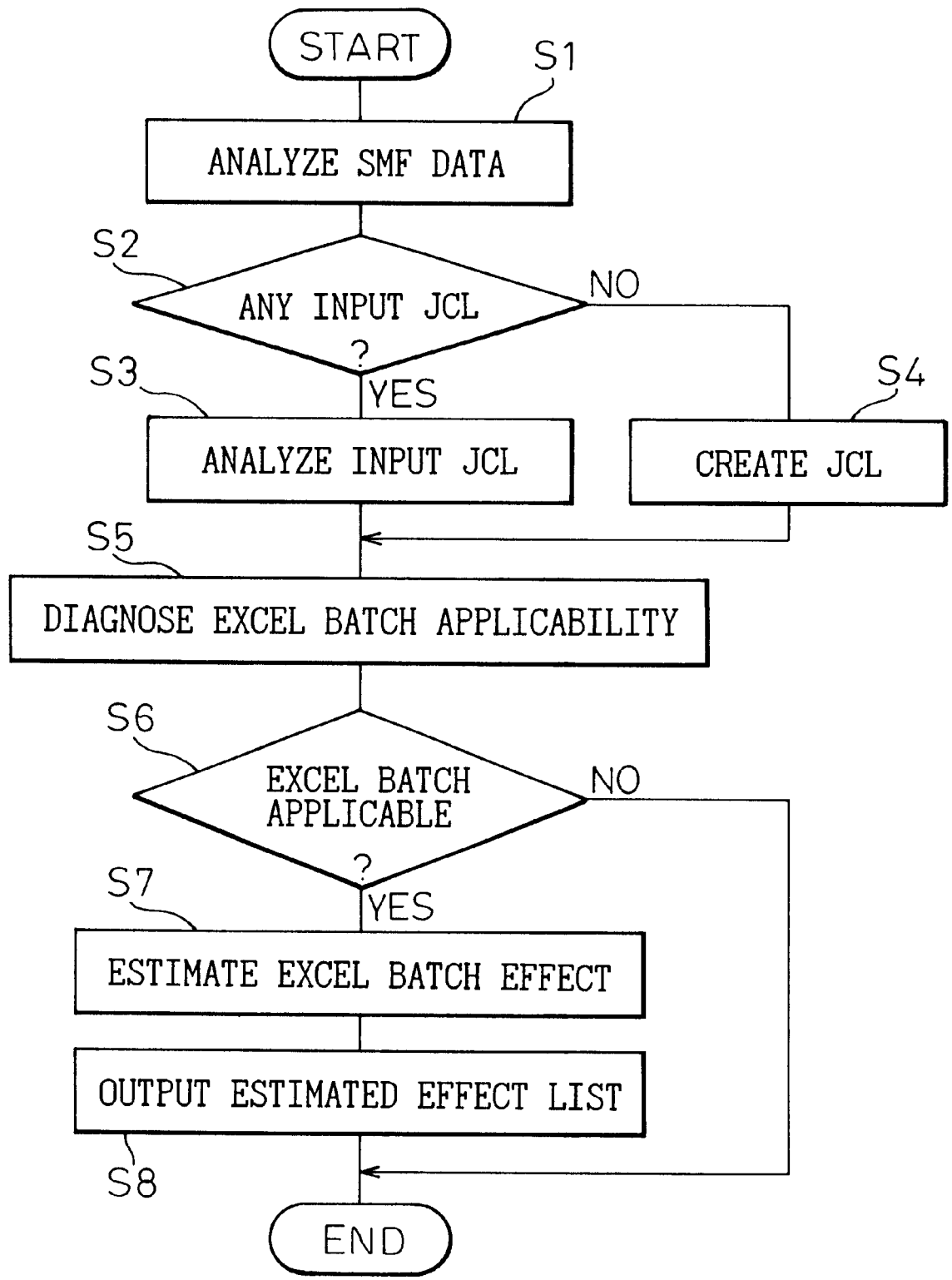
FIG. 2 is a flowchart showing a method of estimating the effect of parallel processing according to the present invention.

FIG. 2 is a flowchart showing a method of estimating the effect of parallel processing according to the present invention. In this example, the flowchart estimates the effect of parallel-processing a job consisting of job steps, i.e., procedures each composed of steps. The explanation of the flowchart will be made with reference to FIG. 1, too.

In step S1, the apparatus 1 collects SMF data SMFIN from the SMF data set 2 and analyzes the data. The details of this will be explained later. In step S2, the apparatus 1 determines whether or not there is an input JCL (job control language) JCLLIB provided by the JCL library 3. If there is, the flow goes to step S3, and if not, step S4. The apparatus 1 may receive a procedure PROCLIB from the procedure library 4. The procedure is called by the input JCL and is useful to improve the accuracy of testing whether or not a pipe data set is used and the accuracy of estimating the effect of parallel processing. In step S3, the apparatus 1 analyzes the input JCL. In step S4, the apparatus 1 creates a JCL.

In step S5, the apparatus 1 carries out an excel batch diagnosis on the job steps. In step S6, the apparatus 1 determines whether or not an excel batch is applicable to the job steps. If YES, the flow goes to step S7, and if NO, the routine ends.

In step S7, the apparatus 1 estimates the effect of the excel batch according to the SMF data analyzed in step S1 and the excel batch diagnosis carried out in step S5. In step S8, the apparatus 1 provides an estimated effect list EFCTLIST 5. The list shows a parallel processing effect on step groups (data sets), procedures (job steps), procedure groups (job step groups), parallel procedure groups (parallel job step groups), and a composite procedure (job).

A recording medium according to the present invention will be explained briefly. The apparatus 1 of FIG. 1 has a reader (not shown) for reading a recording medium such as a CD-ROM and a floppy disk. Programs related to the method of the present invention are recorded on a CD-ROM or a floppy disk, which is read by the reader and is loaded to an auxiliary storage device (not shown). Instead, an operator may directly write the programs into a main memory such as a RAM of the apparatus 1, so that the programs may be loaded to the auxiliary storage device. As and when required, the programs stored in the auxiliary storage device are loaded to the main memory by a CPU (not shown) of the apparatus 1.

A technique of analyzing SMF records and estimating the effect of parallel processing according to a result of the analysis will be explained. The SMF records are prepared when processing job steps in series and contain data as mentioned below.

(a) Type-30 SMF Record
 1) Prepared date and time (used to calculate processing time)
 2) Start date and time (used to calculate processing time)
 3) CPU using time
 4) Swap-in time
 5) Number of I/O operations
(b) Type-14/15 SMF Record
 1) Number of I/O operations for each DD (data definition) statement
 2) Block length (data size in bytes)

Calculating time reduction produced by parallel processing and parallel-processing time according to SMF records will be explained.

(1) The swap-in time is the sum of the CPU using time and the I/O operation time. Accordingly, the time of single I/O operation in a job step that consists of a plurality of steps is calculated as follows:

$$\text{Average I/O time} = (\text{swap-in time of JBS} - \text{CPU using time of JBS})/ \text{number of I/O operations of JBS} \qquad (1)$$

where JBS represents the job step.

(2) The estimated time reduction of each DD (data definition) statement is calculated from the average I/O time of the expression (1) and the number of I/O operations in the DD statement as follows:

$$\text{Estimated time reduction of DD statement} = \text{average I/O time} \times \text{number of I/O operations in DD statement} \qquad (2)$$

(3) The estimated time reduction and estimated processing time of each job step are calculated as follows:

$$\text{Estimated time reduction of job step} = \text{sum of estimated time reductions of DD statements} \qquad (3)$$

$$\text{Estimated processing time of job step} = \text{elapsed time} - \text{estimated time reduction} \qquad (4)$$

(4) The estimated time reduction and estimated processing time of job step groups to be processed in parallel in an excel batch are calculated as mentioned below.

(4-1) If the job step groups employ a pipe data set to transfer data, there will be no time reduction by parallel processing. Accordingly, the estimated processing time of the job step groups is calculated as follows:

$$\text{Estimated processing time of job step groups} = \text{sum of estimated processing time of each job step group} \qquad (5)$$

(4-2) If the job step groups employ no pipe data set, they are completely processed in parallel and a maximum of the values of estimated processing time of the job step groups is used as the estimated processing time of the job step groups.

(5) The estimated processing time of a job is the sum of the values of estimated processing time of job step groups that constitute the job. The estimated time reduction of the job is calculated by subtracting the estimated processing time from the series-processing time of the job that is calculated according to SMF records.

(6) Lastly, the estimated time reduction and estimated processing time of each data set are calculated. The estimated time reduction of a data set is equal to the estimated time reduction of a DD statement of the expression (2). The estimated processing time of a data set is calculated by calculating the series-processing time of steps that form the data set according to SMF records and by subtracting the estimated time reduction of the data set from the calculated series-processing time of the data set.

DD (data definition) statements used to estimate the effect of an excel batch, i.e., parallel processing will be explained.

a) SMF data set DD statement: SMFIN DD statement
This DD statement specifies a data set that stores SMF records related to a job whose effect of parallel processing is estimated.

b) JCL library DD statement: JCLLIB DD statement
This DD statement specifies a data set that stores a JCL that describes the job whose effect of parallel processing is estimated.

c) Procedure library DD statement: PROCLIB DD statement
This DD statement specifies a data set that stores procedures to be called by the JCL when the JCL is input.

d) Estimated effect list output DD statement: EFCTLIB DD statement
This DD statement specifies a data set to provide an effect estimation result.

Figure 3:
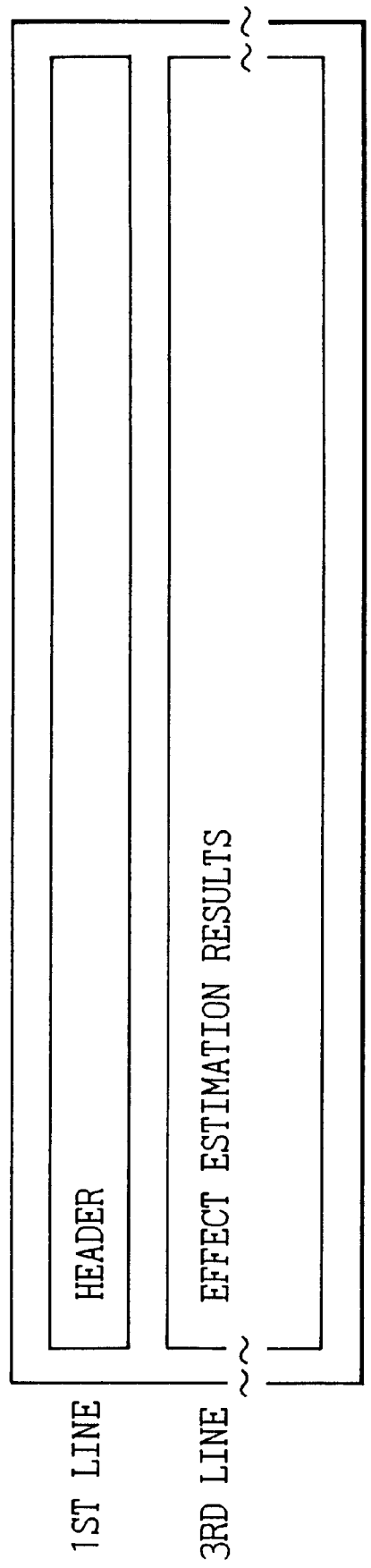
FIG. 3 shows an estimated effect list according to an embodiment of the present invention.
Figure 12:
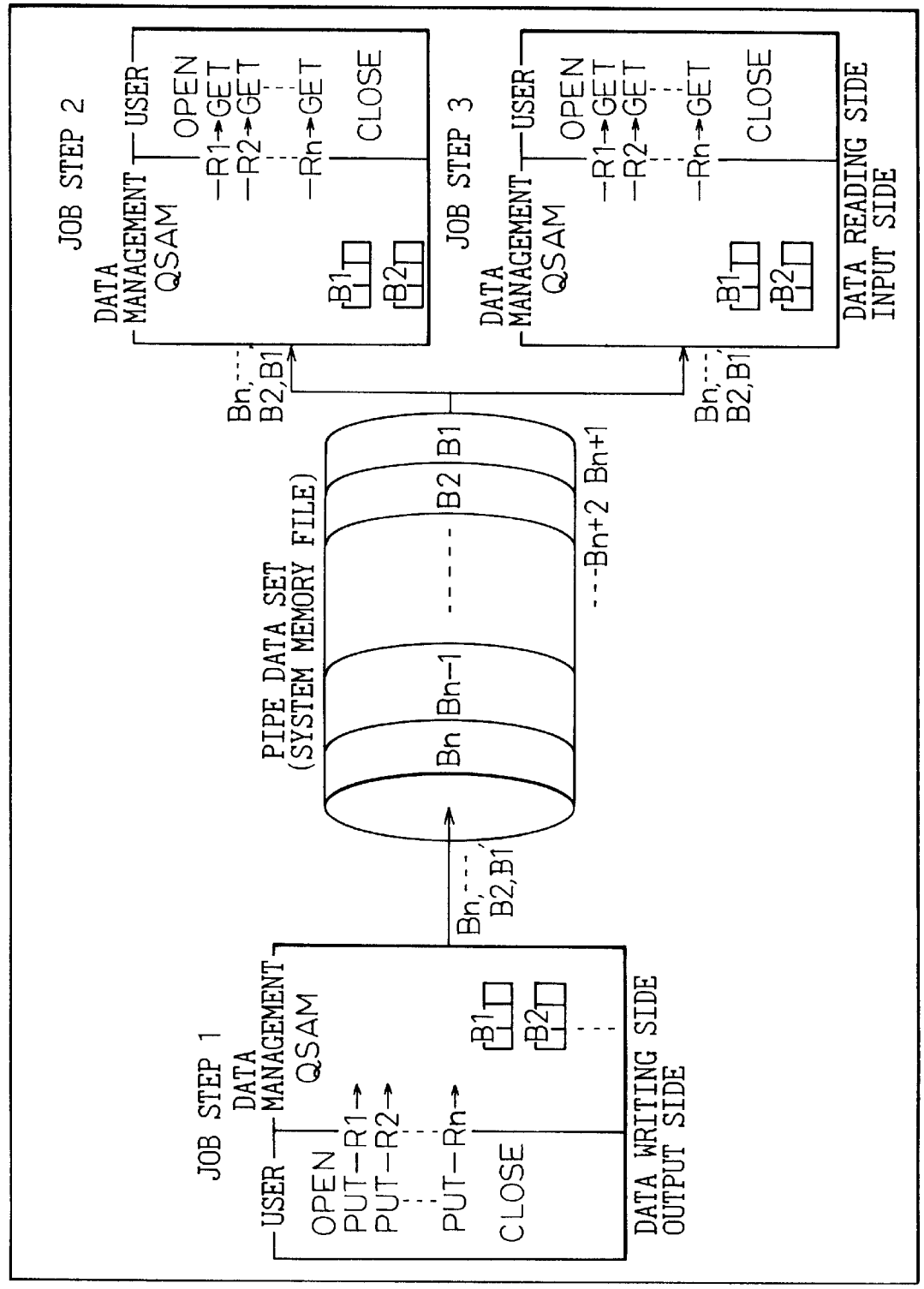
FIG. 12 shows job steps processed in parallel by transferring data through a pipe data set according to a prior art.

FIG. 3 shows an example of an estimated effect list according to the present invention. The first line contains a header, and the third line and lines that follow contain effect estimation results.

FIG. 4 shows an example of the header of FIG. 3. The top line shows column numbers. The next line contains a program name "PDCF TOOL V12L10," a title "EFFECT-LIST" to indicate that this list is an estimated effect list, and date and time when the list was made.

FIG. 5 shows the contents of the third line and lines that follow of the list of FIG. 3. The first section shows column numbers. The second section relates to a job to process and shows the name of the job, excel batch applicability, effect estimation possibility, start time, end time, elapsed time, CPU using time, estimated processing time, estimated time reduction, and estimated processing-time reduction rate.

The third section relates to job step groups contained in the job and shows, for each of the job step groups, the name of the group, the number of job steps in the group, start time, end time, elapsed time, CPU using time, estimated processing time, estimated time reduction, and estimated processing-time reduction rate. If SMF data is invalid, the third section is not provided.

The fourth section relates to the job steps and shows, for each of the job steps, a job step number, the name of the job step, average I/O time, the name of the job step group that contains the job step, start time, end time, elapsed time, CPU use time, estimated processing time, estimated time reduction, and estimated processing-time reduction rate. If SMF data is invalid, the fourth section is not provided.

The fifth section relates to data sets and shows, for each of the data sets, the name of the data set, pipe data set applicability, a block size optimization result, a job step number that uses the data set, the name of a DD statement, estimated time reduction, and estimated processing-time reduction rate. If SMF data is invalid, the fifth section is not provided.

FIGS. 6A and 6B show an example of an output form of an estimated parallel-processing effect on a job, in which FIG. 6A shows the left half of the form and FIG. 6B shows the right half thereof. The form contains (a) the name of the job, (b) excel batch applicability (if an analysis or interpretation of a JCL shows a JCL error, or if SMF data is invalid, an excel batch is inapplicable), (c) effect estimation possibility (if a JCL error or SMF data invalidity is found, effect estimation is impossible), (d) start time, (e) end time, (f) elapsed time, (g) CPU use time, (h) estimated processing time, (i) estimated time reduction, (j) estimated processing-time reduction rate, and (k) the reason why the estimation is impossible, i.e., the cause of the JCL error or SMF data invalidity.

FIG. 7 shows an example of an output form of an estimated parallel-processing effect on job step groups. The form contains, for each of the job step groups, (a) the name of the group, (b) the number of job steps in the group, (c) start time, (d) end time, (e) elapsed time, (f) CPU using time, (g) estimated processing time, (h) estimated time reduction, and (i) estimated processing-time reduction rate.

FIGS. 8A and 8B show an example of an output form of an estimated parallel-processing effect on job steps, in which FIG. 8A shows the left half of the form and FIG. 8B shows the right half thereof. The form contains, for each of the job steps, (a) a job step number, (b) the name of the job step, (c) average I/O time (in seconds), (d) the name of a job step group that contains the job step, (e) start time, (f) end time, (g) elapsed time, (h) CPU using time, (i) estimated processing time, (j) estimated time reduction, and (k) estimated processing-time reduction rate.

FIG. 9 shows an example of an output form of an estimated parallel-processing effect on data sets. The form contains, for each of the data sets, (a) the name of the data set, (b) pipe data set applicability, (c) a block size optimization result, (d) a job step number that uses the data set, (e) the name of a DD statement that defines the data set, (f) estimated time reduction in the corresponding job step due to the pipe data set application and block size optimization of the data set, and (g) estimated processing-time reduction rate on the corresponding job step due to the pipe data set application and block size optimization of the data set.

FIG. 10 shows an example of an output form of an estimated effect list. Similar to the forms shown in FIGS. 3 to 5, the first line of FIG. 10 contains a header and the third line and lines that follow contain effect estimation results. Testing pipe data set applicability will be explained briefly.

FIG. 11 shows an example of JCL for job steps to be processed in parallel. Each instruction statement of each job step includes a job step number, a DD statement number (if required), and a JCL instruction. The JCL instruction includes a parallel group parameter PARA GRP and a pipe data set parameter PIPE. Based on the JCL shown in FIG. 11, pipe data set applicability is tested. A pipe data set is inapplicable if a data set is defined with a single DD statement, or if no data set is newly prepared, or if DD statements in a single job step define data sets having the same name. In this way, the present invention examines a JCL to accurately determine pipe data set applicability. This technique is more accurate in estimating the processing time and time reduction of the parallel processing of job steps than with the use of only SMF records.

Although the embodiments mentioned above employ a printer to output an estimated effect list, the present invention is not limited to this. For example, the list may be displayed on a CRT.

As explained above, the present invention provides a method of automatically estimating the effect of processing job steps in parallel by computer, and a recording medium used for the method. The present invention greatly reduces time and labor for estimating the effect of parallel processing.

It will be understood by those skilled in the art that the foregoing descriptions are preferred embodiments of the disclosed methods and that various changes and modifications may be made to the invention without departing from the spirit and scope thereof.

What is claimed is:

1. A method of estimating the effect of processing steps of procedures in parallel by a computer, comprising the steps of:

collecting SMF records prepared when processing the steps of the procedures in series;

calculating, from the SMF records, series-processing time for processing the steps of the procedures in series;

estimating, from the SMF records, time reduction produced by processing the steps of the procedures in parallel; and estimating parallel-processing time by subtracting the time reduction from the series-processing time, thereby estimating the effect of processing the steps of the procedures in parallel.

2. The method of claim 1, further comprising the step of editing and outputting the estimated effect.

3. The method of claim 2, further comprising the steps of:

analyzing, in addition to analyzing the SMF records, JCL that describes each instruction of each step of each procedure, to identify any group of steps that transfer data through a pipe data set.

4. The method of claim 1, further comprising the steps of:

analyzing, in addition to analyzing the SMF records, JCL that describes each instruction of each step of each procedure, to identify any group of steps that transfer data through a pipe data set.

5. A method of estimating the effect of processing first and second procedure groups in parallel by computer, the first procedure group transferring data through a pipe data set, the second procedure group transferring no data through a pipe data set, comprising the steps of:

collecting SMF records prepared when processing the first and second procedure groups in series;

calculating, from the SMF records, series-processing time for processing the first and second procedure groups in series;

summing up estimated processing time of each procedure of the first procedure group according to the SMF records, to provide a first processing time for processing the first procedure group in parallel;

choosing a maximum among the values of estimated processing time of procedures of the second procedure group according to the SMF records, to provide a second processing time for processing the second procedure group in parallel;

choosing a maximum between the values of the first and second processing times, to provide a parallel-processing time for processing the first and second procedure groups in parallel; and estimating time reduction produced by the parallel processing of the first and second procedure groups by subtracting the parallel-processing time from the series-processing time, thereby estimating the effect of processing the first and second procedure groups in parallel.

6. The method of claim 5, further comprising the step of editing and outputting the estimated effect.

7. The method of claim 6, wherein the first and second procedure groups form a composite procedure, and series-processing time of the composite procedure is calculated by summing up the parallel-processing time of each of the first and second procedure groups.

8. The method of claim 6, further comprising the steps of:

analyzing, in addition to analyzing the SMF records, JCL that describes each instruction of each step of each procedure, to identify any group of steps that transfer data through a pipe data set.

9. The method of claim 5, wherein the first and second procedure groups form a composite procedure, and series-processing time of the composite procedure is calculated by summing up the parallel-processing time of each of the first and second procedure groups.

10. The method of claim 9, further comprising the steps of:

analyzing, in addition to analyzing the SMF records, JCL that describes each instruction of each step of each procedure, to identify any group of steps that transfer data through a pipe data set.

11. The method of claim 5, further comprising the steps of:

analyzing, in addition to analyzing the SMF records, JCL that describes each instruction of each step of each procedure, to identify any group of steps that transfer data through a pipe data set.

12. A method of estimating the effect of processing a first group of steps in parallel by computer, the first group of steps and a second group of steps constituting a procedure, the first group of steps transferring data through a pipe data set, the second group of steps transferring no data through a pipe data set, comprising the steps of:

collecting SMF records prepared when processing the procedure in series; and estimating, from the SMF records, a time reduction produced by processing the first group of steps in parallel, thereby estimating the effect of processing the first group of steps in parallel.

13. The method of claim 12, further comprising the step of editing and outputting the estimated effect.

14. The method of claim 13, further comprising the steps of:

analyzing, in addition to analyzing the SMF records, JCL that describes each instruction of each step of each procedure, to identify any group of steps that transfer data through a pipe data set.

15. The method of claim 12, comprising, if the procedure consists of a plurality of first groups of steps, the steps of:

summing up the estimated time reduction of each first group of steps, to estimate a time reduction achieved in the procedure;

calculating, from the SMF records, a series-processing time for processing the procedure in series; and subtracting the time reduction from the series-processing time, to estimate parallel-processing time for processing the procedure in parallel.

16. The method of claim 15, further comprising the steps of:

analyzing, in addition to analyzing the SMF records, JCL that describes each instruction of each step of each procedure, to identify any group of steps that transfer data through a pipe data set.

17. The method of claim 12, further comprising the steps of:

analyzing, in addition to analyzing the SMF records, JCL that describes each instruction of each step of each procedure, to identify any group of steps that transfer data through a pipe data set.

18. A recording medium that records a program so that a computer may read and execute the program to:

collect SMF records prepared when processing steps of procedures in series;

calculate, from the SMF records, a series-processing time for processing the steps of the procedures in series;

estimate, from the SMF records, a time reduction produced by processing the steps of the procedures in parallel; and estimate a parallel-processing time by subtracting the time reduction from the series-processing time, thereby estimating the effect of processing the steps of the procedures in parallel by a computer.

19. The recording medium of claim 18, wherein the recording medium records a program for making the computer edit and output the estimated effect.

* * * * *